UNITED STATES PATENT OFFICE.

KARL BARON VON VIETINGHOFF, OF BERLIN, GERMANY.

METHOD OF MAKING HIGHLY-AROMATIC, CLEARLY-SOLUBLE, SOLID COFFEE EXTRACT.

1,175,091.  Specification of Letters Patent.  Patented Mar. 14, 1916.

No Drawing.  Application filed August 4, 1914. Serial No. 854,959.

*To all whom it may concern:*

Be it known that I, KARL BARON VON VIETINGHOFF, residing at Berlin, in the German Empire, and a subject of the King of Prussia, in the Empire of Germany, and of the German Emperor, have invented certain new and useful Improvements in Methods of Making Highly - Aromatic, Clearly-Soluble, Solid Coffee Extract, of which the following is a specification.

The manufacture of coffee extract in a solid form has hitherto been attempted by two different methods. One method consists in roasting the aqueous and subsesists quently dried extract obtained from raw coffee beans, and the other in lixiviating the roasted coffee beans and then evaporating this extract. The methods of the former kind suffer from the disadvantage that some substances are also dissolved from the raw beans which become insoluble at the subsequent roasting of the evaporated extract, so that the extract, when ready for use, leaves a considerable residue, when hot water is poured over it, in order to prepare coffee. Besides the difficulty is encountered, of having to evaporate the albuminous extract from the raw beans, as it foams very much and becomes very viscous with increasing concentration, so that the last particles of water will escape very slowly. It is, therefore, exceedingly difficult to evaporate such extract to complete dryness and much time is required therefor. Lastly the thus obtained raw dry extract can be roasted in an approximately homogeneous manner only with the aid of special appliances. The second method of making coffee extract in solid form consists essentially in lixiviating the roasted coffee beans with boiling water and then evaporating the aqueous solution to dryness. These methods have the disadvantage, that the coffee made of such extract has a stale, non-aromatic flavor, which will not even meet the most modest demands. It has been proposed to collect the aroma, which is volatilized in evaporating the aqueous extract of the roasted coffee beans and to add the same to the finished extract, but without any satisfactory success.

It has now been found, that the solid extract which is obtained by lixiviating roasted coffee beans with boiling water and thereupon evaporating such solution to dryness will show a considerable improvement in flavor and aroma if it is subjected to a second roasting. This second roasting is preferably performed in an open vessel, which allows the vapors formed to escape, and in which the said extract is heated for 10–20 minutes to a temperature of about 225° cent. The thus obtained extract will produce, when dissolved in hot water, a coffee of a strong, refreshing flavor, even though it has a somewhat weak aroma.

It has further been found, that in lixiviating roasted coffee beans with boiling water the coffee aroma contained in the roasted beans will first pass into the aqueous solution, but will, to the greater part, be decomposed during the subsequent evaporation and cannot be again recovered by collecting. On the other hand, however, it may be extracted together with the fat contained in the coffee bean by means of fat solvents, and if water is avoided, no material decomposition will occur while the solvent (benzene, benzole, chlorid of carbon or the like) is being driven off.

It has been found to be of particular advantage to extract the roasted coffee beans with such a fat solvent, before lixiviating them with water, whereby at the same time the whole of the aroma passes over into the fat solution. From the latter it may subsequently be recovered in a suitable manner, for example by shaking with methyl alcohol or the like. It is a thick, waxy product of a bitter taste and highly intense coffee odor and flavor, and added in suitable quantity to the solid coffee extract obtained as hereinbefore described by evaporating the aqueous extract from roasted coffee beans it will give such extract any desired degree of the natural aroma. Instead of adding such aroma alone to the extract, a mixture of aroma and fat may also be added, by using the fat remaining after the fat solvent has been driven off.

I claim—

1. Method of making highly aromatic, completely soluble, solid coffee extract, consisting in subjecting to a second roasting the solid extract obtained by lixiviating roasted coffee beans with water and evaporating the aqueous solution so obtained.

2. Method of making highly aromatic, completely soluble, solid coffee extract, consisting in subjecting to a second roasting the solid extract obtained by lixiviating roasted coffee beans with water and evaporating the aqueous solution so obtained and adding to said extract after the second roasting quantities of aromatic coffee fat, obtained by extracting roasted coffee beans with a fat solvent and driving off the said fat solvent.

3. Method of making highly aromatic, completely soluble, solid coffee extract, consisting in subjecting to a second roasting the solid extract obtained by lixiviating roasted coffee beans with water and evaporating the aqueous solution so obtained and adding to said extract after said second roasting quantities of pure coffee aroma obtained by extracting roasted coffee beans with a fat solvent and separating the fat from the extracted mixture.

4. A method of making highly aromatic, completely soluble, solid coffee extract, consisting in lixiviating roasted coffee beans with water, evaporating the aqueous solution so obtained to a dry residue, and subjecting this residue to a second roasting, the vapors formed during said second roasting being allowed to freely escape.

5. A method of making highly aromatic, completely soluble, solid coffee extract, consisting in lixiviating roasted coffee beans with water, evaporating the aqueous solution so obtained to a dry residue, and subjecting this residue to a second roasting, the vapors formed during said second roasting being allowed to freely escape, said extract being heated during said second roasting for at least ten minutes and to a temperature of about 225° centigrade.

In testimony whereof I have affixed my signature in presence of two witnesses.

KARL BARON von VIETINGHOFF.

Witnesses:
HENRY HASPER,
WOLDEMAR HAUPT.